US009954735B2

United States Patent
Luo (10) Patent No.: US 9,954,735 B2
(45) Date of Patent: Apr. 24, 2018

(54) REALIZING GRACEFUL RESTART IN IS-IS NETWORK

(71) Applicant: Hangzhou H3C Technologies Co., Ltd., Hangzhou (CN)

(72) Inventor: Guobing Luo, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 131 days.

(21) Appl. No.: 14/769,045

(22) PCT Filed: Mar. 11, 2014

(86) PCT No.: PCT/CN2014/073162
§ 371 (c)(1),
(2) Date: Aug. 19, 2015

(87) PCT Pub. No.: WO2014/173209
PCT Pub. Date: Oct. 30, 2014

(65) Prior Publication Data
US 2016/0036630 A1 Feb. 4, 2016

(30) Foreign Application Priority Data
Apr. 26, 2013 (CN) .......................... 2013 1 0151677

(51) Int. Cl.
*H04L 12/24* (2006.01)
*H04L 12/713* (2013.01)
*H04L 29/08* (2006.01)

(52) U.S. Cl.
CPC .......... *H04L 41/082* (2013.01); *H04L 45/586* (2013.01); *H04L 67/16* (2013.01)

(58) Field of Classification Search
None
See application file for complete search history.

(56) References Cited

U.S. PATENT DOCUMENTS

2009/0219807 A1 9/2009 Wang
2011/0116366 A1* 5/2011 Smith .................. H04L 45/02
370/225

(Continued)

FOREIGN PATENT DOCUMENTS

CN 101399824 4/2009
CN 102170399 8/2011

(Continued)

OTHER PUBLICATIONS

English Machine Translation of Chinese Document CN102170399.*

(Continued)

*Primary Examiner* — Hassan Phillips
*Assistant Examiner* — Gautam Sharma
(74) *Attorney, Agent, or Firm* — Hewlett Packard Enterprise Patent Department (57) ABSTRACT

Before restarting an IS-IS protocol process, the first device sends an IIH packet with a RR flag set and a hold time field being a first predetermined value to a second device. The first predetermined value is greater than a normal value of a hold time kept in the second device for the first device, and the first device establishes an adjacency with the second device. After receiving an IIH packet with a RA flag replied by the second device, the first device restarts the IS-IS protocol process and starts to execute a GR process. The IIH packet with the RA flag set is replied by the second device after the second device updates the hold time kept in the second device for the first device according to the first predetermined value.

20 Claims, 6 Drawing Sheets

(56) References Cited

U.S. PATENT DOCUMENTS

| | | | |
|---|---|---|---|
| 2013/0135992 A1* | 5/2013 | Callejo Rodriguez | H04L 41/0836 370/228 |
| 2014/0149819 A1* | 5/2014 | Lu | H04L 45/021 714/748 |
| 2014/0223155 A1* | 8/2014 | Vasseur | G06F 9/4405 713/2 |
| 2015/0085644 A1* | 3/2015 | Kotalwar | H04L 45/28 370/228 |

FOREIGN PATENT DOCUMENTS

| | | |
|---|---|---|
| CN | 102361474 | 2/2012 |
| CN | 102546427 | 7/2012 |
| CN | 103227792 | 7/2013 |

OTHER PUBLICATIONS

CN First Office Action dated Jun. 30, 2015, CN Patent Application No. 201310151677.0 dated Apr. 26, 2013, State Intellectual Property Office of the P.R. China.

International Search Report and Written Opinion dated Jun. 5, 2014, PCT Patent Application No. PCT/CN2014/073162 dated Mar. 11, 2014, State Intellectual Property Office, P.R. China.

Oran, David, "OSI IS-IS Intra-domain Routing Protocol", Digital Equipment Corp., RFC 1142 Feb. 1990.

R. Callon, "Use of OSI IS-IS for Routing in TCP/IP and Dual Environments", Digital Equipment Corporation, RFC 1195, Dec. 1990.

Shand, M. and Ginsberg, L., "Restart Signalling for IS-IS", Cisco Systems, RFC 5306, Oct. 2008.

* cited by examiner

REALIZING GRACEFUL RESTART IN IS-IS NETWORK

CLAIM FOR PRIORITY

The present application is a national stage filing under 35 U.S.C. § 371 of PCT application number PCT/CN2014/073162, having an international filing date of Mar. 11, 2014, which claims priority to Chinese patent application number 201310151677.0, having a filing date of Apr. 26, 2013, the disclosure of which is hereby incorporated by reference in its entirety.

BACKGROUND

Intermediate System-to-Intermediate System (IS-IS) protocol is a dynamic routing protocol originally designed by the International Organization for Standardization (ISO) to operate on the connectionless network protocol (CLNP).

In IS-IS, all link states in the network forms a link state database (LSDB). There is at least one LSDB in each IS. The IS uses a shortest path first (SPF) algorithm and LSDB to generate its own routes. Each IS can generate a link State Protocol Data Unit (LSPDU) or link state packet (LSP) which contains all the link state information of the IS. Each IS collects all the LSPs in the local area to generate its own LSDB.

Graceful Restart (GR) is a mechanism that enables a device to forward data uninterruptedly when it performs an active/standby switchover or restarts a routing protocol. When a GR-capable device restarts a routing protocol, it notifies the event to its neighbors, which then maintain adjacencies and the routing information of the device within a specified interval. After the protocol is restarted, the device retrieves the information (topology, routing and session information maintained by the protocol supporting GR) from the neighbors and restores the state before reboot. During the restart process, no route flapping occurs and no forwarding path is changed. Thus, the system can operate continuously. IS-IS GR can ensure the service continuity of an IS-IS-enabled device such as a router during active/standby switchover or IS-IS restart.

DETAILED DESCRIPTION

To support GR capability, the IS-IS is extended as follows: the Restart TLV (Type, Length, Value) and three timers including T1, T2 and T3 are added in IS-IS hello packets (IIH).

(1) Restart TLV

To ensure this device to notify neighbor devices of a reboot, a Restart TLV with Type 211 is added. The Restart TLV includes Restart Request (RR), Restart Acknowledgement (RA), Suppress Adjacency (SA) and Restarting Neighbor System ID and other fields. Meaning of each field is illustrated as following:

Restart Request (RR): Restart Request flag; when set to 1, it indicates that this device is just restarted;

Restart Acknowledgement (RA): Restart Acknowledgement flag; when set to be 1, it indicates the packet is an acknowledgement packet sent to the restarted device;

Suppress Adjacency (SA): Suppress Adjacency flag; it is an optional bit that aims to avoid the occurrence of black hole routes;

Remaining Time indicates the remaining time (in seconds) before the neighbor ages out; when this time expires, the adjacency terminates;

Restarting Neighbor System ID indicates a system ID of a restarted device.

(2) Timers: T1, T2 and T3

Similar to the IIH timer of the IS-IS, a T1 timer is set on each interface to define an interval for sending IIH packets with the RR flag set. A device creates a T1 timer on each interface after reboot, and periodically sends IIH packets with the flag set. After receiving an IIH packet with the RA flag set and all CSNP packets, an interface removes the T1 timer. When the T1 timer expires, the T1 timer is restarted and the above process resumes. When an interface has no neighbor or has a neighbor that is not GR-capable, the interface cannot cancel the T1 timer because it cannot receive any IIH packet with the RA flag set. To avoid this, IS-IS GR specifies the maximum expiration times for T1 timer. When the times a T1 timer exceeds the specified value, the T1 timer is automatically cancelled.

A T2 timer defines the maximum wait time for the synchronization of a LSDB after device reboot. Each LSDB has a T2 timer. For example, a Level-1-2 router has two T2 timers: one for Level-1 LSDB synchronization, and the other for Level-2 LSDB synchronization. When the LSDB synchronization of a level completes, the corresponding T2 timer is cancelled. When LSDB synchronization does not complete when the T2 timer expires, the T2 timer is cancelled and the GR process fails.

A T3 timer defines the maximum time of a GR process on a device. An IS-IS router has only one T3 timer, which has an initial value of 65535 seconds. However, the T3 timer will be set to the minimum Remaining Time value among the IIH packets with the RA flag set received on all interfaces. When the LSDB synchronization does not complete when the T3 timer expires, the T3 timer is cancelled and the GR process fails.

In the IS-IS, a device can check an adjacency between this device and a neighbor device according to a hold time of the neighbor device. When no hello packet is received from the neighbor device within the hold time, this device deletes the corresponding adjacency; subsequently, after the device receives a hello packet from the neighbor device, an adjacency reestablishes between this device and the neighbor device, which causes adjacency flapping. Particularly for a designed intermediate system (DIS), since a hold time of the DIS is ⅓ of those of other devices, for example, a hold time of the DIS is 6-9 seconds in the default configuration, thus, when a neighbor device does not receive a Hello packet from the DIS within 6-9 seconds, the neighbor device will delete the corresponding adjacency.

So, in an actual IS-IS GR process, for example, during a GR process in which a restarted device such as a router A updates software, packet sending and receiving time is not controllable due to the upgrading process, upgrading order, network congestion and other reasons; when a neighbor device such as a router B does not receive an IIH packet from the restarted device within a corresponding hold time, the neighbor device deletes an adjacency with the restarted device, causing GR failure.

In order to solve the GR failure, following examples of the present application provides a method for realizing GR in an IS-IS network and an apparatus which can use this method.

It should be noted, a first device in following examples can be any device supporting the IS-IS protocol, such as a router, a server and so on, and this is not limited in the present disclosure. A second device can be any device which has established an adjacency with the first device.

Figure 1:
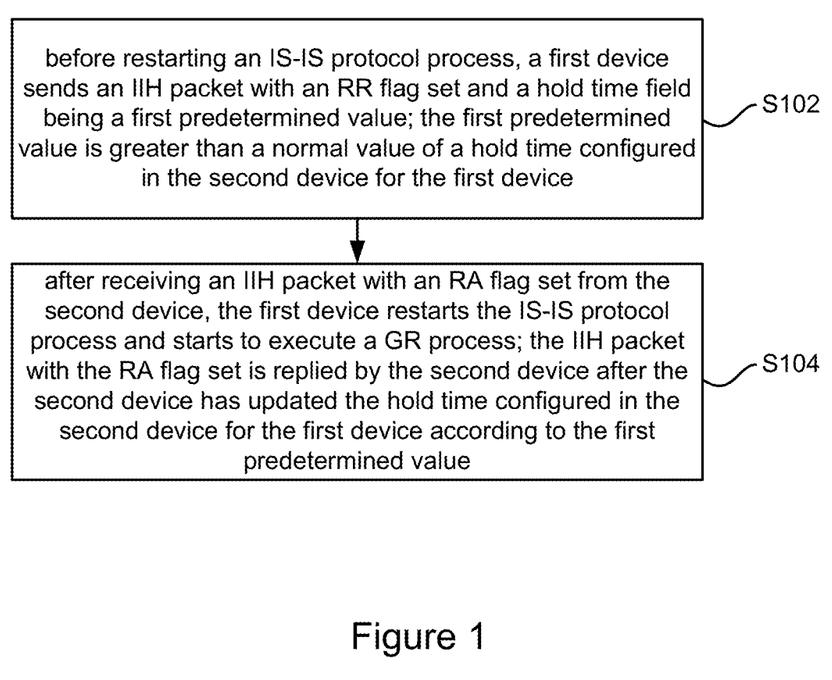
FIG. 1 is a flow chart of a method for realizing GR in an IS-IS network according to one example of the present disclosure.

As shown in FIG. 1, a method for realizing GR in an IS-IS network according to one example of the present disclosure includes following blocks:

Block S102: before restarting an IS-IS protocol process, a first device sends an IIH packet with an RR flag set and a hold time field being a first predetermined value to a second device; the first predetermined value is greater than a normal value of a hold time kept in the second device for the first device.

The normal value of the hold time kept in the second device for the first device may, for example, be a default hold time after which the second device will delete an IS-IS adjacency with the first device if the second device has not received an IIH packet from the first device. The normal value may be set according to the operating environment. In one example, the normal value of a designated IS (DIS) device may be set as 10 seconds, and the normal value of a common IS device may be set as 30 seconds. The first predetermined value can be configured in advance according to actual needs, for example, configured according to actual operating environment. The first predetermined value needs to be configured to be a larger value than the normal hold time. In one example, the first predetermined value is greater than the normal value of the hold time kept in the second device for the first device and is smaller than or equal to a maximum forwarding information base (fib) lifetime. In some applications, the first predetermined value can be configured to be slightly less than the maximum fib lifetime in the default configuration. For example, in the default configuration, the first predetermined value may be 300 seconds.

Block S104: after receiving an IIH packet with an RA flag set from the second device, the first device restarts the IS-IS protocol process and starts to execute a GR process; the IIH packet with the RA flag set is replied by the second device after the second device has updated the hold time kept in the second device for the first device according to the first predetermined value.

When the first device does not receive the IIH packet with the RA flag set from the second device, it indicates that the packet is lost; the first device continues to send IIH packets with the RR flag set until the first device receives the IIH packet with the RA flag set from the second device, and then restarts the IS-IS protocol process to execute a GR process.

When the first device receives the IIH packet with the RA flag set from the second device, it indicates that the second device has set the hold time for the first device with the first predetermined value and the second device deems that the first device does not exist when no packet is received from the first device within the first predetermined time.

In the block S104, starting to execute a GR process includes follows:

the first device simultaneously starts a T1 timer, a Timer T2 and a T3 timer, and sends an IIH packet with an RR flag set to the second device;

when the first device receives the IIH packet with the RA flag set and all CSNP packets from the second device before the T1 timer reaches a maximum expiration time, the first device cancels the T1 timer;

the first device sends an IIH packet with an RR flag not set and an RA flag not set to the second device, and synchronizes LSDB; the RR flag not set shows that the RR flag is 0, and the RA flag not set shows that the RA flag is 0.

when the first device completes the LSDB synchronization before the T2 timer expires, the first device cancels the T2 timer and the T3 timer.

In order to enable the second device to restore the hold time kept for the first device from the first predetermined value to the normal value, the first device can adopt any one of the following ways.

First way: the hold time field in the IIH packet with the RR flag set sent to the second device when executing the GR process is set to be: the normal value of the hold time kept in the second device for the first device; then, after the second device receives the IIH packet with the RR flag set, the second device restores the hold time kept for the first device from the first predetermined value to the normal value;

Second way: the hold time field in the IIH packet with the RR flag not set and the RA flag not set sent to the second device when executing the GR process is set to be: the normal value of the hold time kept in the second device for the first device; then, after the second device receives the IIH packet with the RR flag not set and the RA flag not set, the second device restores the hold time kept for the first device from the first predetermined value to the normal value;

In the second way, in the IIH packet with the RR flag set sent to the second device when executing the GR process, the hold time field is the first predetermined value.

Third way: after the first device completes executing the GR process, the first device sends an IIH packet with the RR flag not set and the RA flag not set sent to the second device according to a normal neighbor detection process, and the hold time field in the IIH packet with both of the RR flag and the RA flag not set is set to be the normal value of the hold time kept in the second device for the first device; then, after the second device receives the IIH packet with the RR flag not set and the RA flag not set, the second device restores the hold time kept for the first device from the first predetermined value to the normal value.

In the third way, in the IIH packet with the RR flag set sent to the second device when executing the GR process, the hold time field is the first predetermined value; and in the IIH packet with the RR flag not set and the RA flag not set sent to the second device when executing the GR process, the hold time field is also the first predetermined value.

In the technical solution of this example, before the first device restarts the IS-IS protocol process when the first device needs to restart the IS-IS protocol process due to reboot or software upgrade, etc., and before first device starts executing the GR process, the first device first performs a negotiation process with the second device which has established an adjacency with the first device. In the negotiation process, the first device first sends the IIH packet with the RR flag set and the hold time field being the first predetermined value which is larger to the second device; after the second device receives the IIH packet, the second device changes the hold time of the first device with the first predetermined value, and replies the IIH packet with the RA flag set to the first device for acknowledgement; after the first device receives the IIH packet with the RA flag set replied by the second device for acknowledgement, the first device restarts the IS-IS protocol process and starts to executing the GR process. Since the second device changes the hold time of the first device with a larger value during the GR process of the first device, thus, the second device deems that the first device exists within a time period of the specified larger value and helps the first device to complete the GR process without changing the existing GR operating mechanism. Further, the first device has performed the above negotiation process before the GR process, and the second device has changed the hold time of the first device with a larger value before receiving a first packet of the GR process; in this way, even if the first packet of the GR process is sent late, the second device will not delete the adjacency between the first device and the second device, which can avoid the GR failure caused by adjacency flapping and keep the adjacency normal.

In this example, a specific operation process performed by the second device is similar to steps S202 to S208 performed by the first device in a following example, and will not be repeated here.

Figure 2:
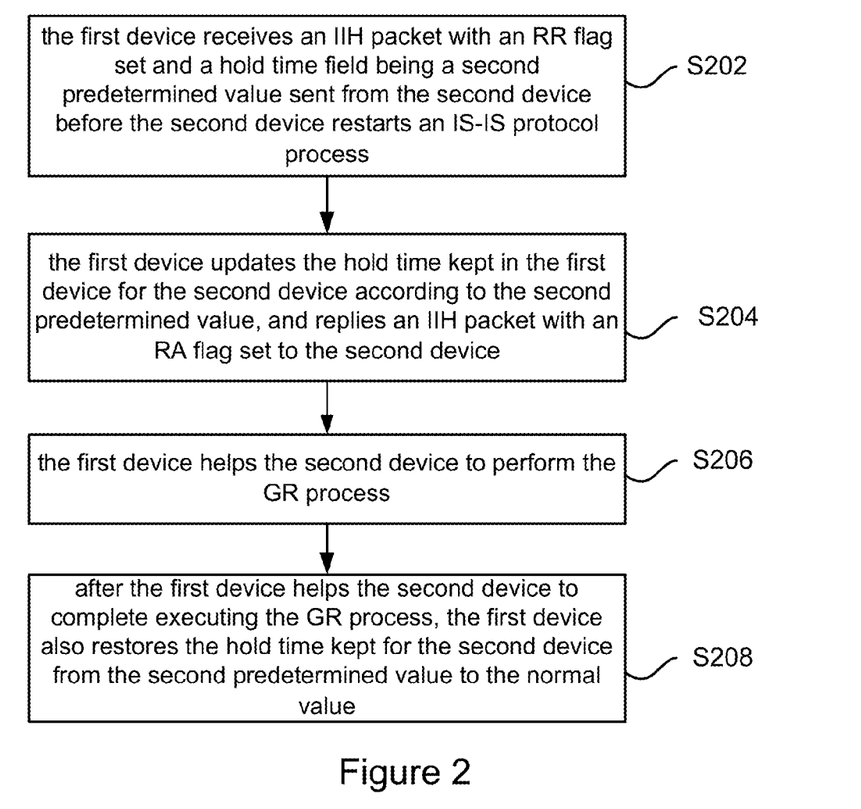
FIG. 2 is a flow chart of a specific operation process of the method for realizing GR according to one example of the present disclosure.

In the above example, the first device is used as a device to perform the GR process; apparently, the first device can also be used as an auxiliary device to help a neighbor device to perform the GR process. As shown in FIG. 2, in this example, when the first device helps the second device to perform the GR process, operation steps needed to be performed by the first device are as follows.

Block S202: the first device receives an IIH packet with an RR flag set and a hold time field being a second predetermined value sent from the second device before the second device restarts an IS-IS protocol process; the second predetermined value is greater than a normal value of a hold time kept in the first device for the second device.

Similar to the normal value of the hold time kept in the second device for the first device, the normal value of the hold time kept in the first device for the second device may, for example, be a default hold time after which the first device will delete an IS-IS adjacency with the second device if the first device has not received an IIH packet from the second device. Similar to the first predetermined value, in actual applications, the second predetermined value can be configured in advance according to actual needs, for example, configured according to actual operating environment. The second predetermined value needs to be configured to be a larger value. For example, in actual applications, the second predetermined value can be configured to be slightly less than the maximum fib lifetime in the default configuration. For example, in the default configuration, the second predetermined value can be 300 seconds.

Block S204: the first device updates the hold time kept in the first device for the second device according to the second predetermined value, and replies an IIH packet with an RA flag set to the second device.

Block S206: the first device helps the second device to perform the GR process.

In the block S206, the first device helps the second device to perform the GR process in a way which includes following steps:

the first device receives an IIH packet with an RR flag set sent from the second device; when the hold time field in the IIH packet with the RR flag set is the normal value of the hold time kept in the first device for the second device, the first device also restores the hold time kept for the second device from the second predetermined value to the normal value; thus, this will not affect a neighbor detection time in normal circumstances;

the first device replies an IIH packet with an RA flag set and a CSNP packet to the second device;

the first device receives an IIH packet with both of an RR flag and an RA flag not set sent from the second device; when the hold time field in the IIH packet with both of the RR flag and the RA flag not set is the normal value of the hold time kept in the first device for the second device, the first device also restores the hold time kept for the second device from the second predetermined value to the normal value; thus, this will not affect a neighbor detection time in normal circumstances;

the first device synchronizes LSDB of the second device to the second device.

Block S208: after the first device helps the second device to complete executing the GR process, the first device also receives an IIH packet with both of the RR flag and the RA flag not set sent from the second device according to the normal neighbor detection process; when the hold time field in the IIH packet with both of the RR flag and the RA flag not set is the normal value of the hold time kept in the first device for the second device, the first device also restores the hold time kept for the second device from the second predetermined value to the normal value. In this way, this will not affect a neighbor detection time in normal circumstances.

Figure 3:
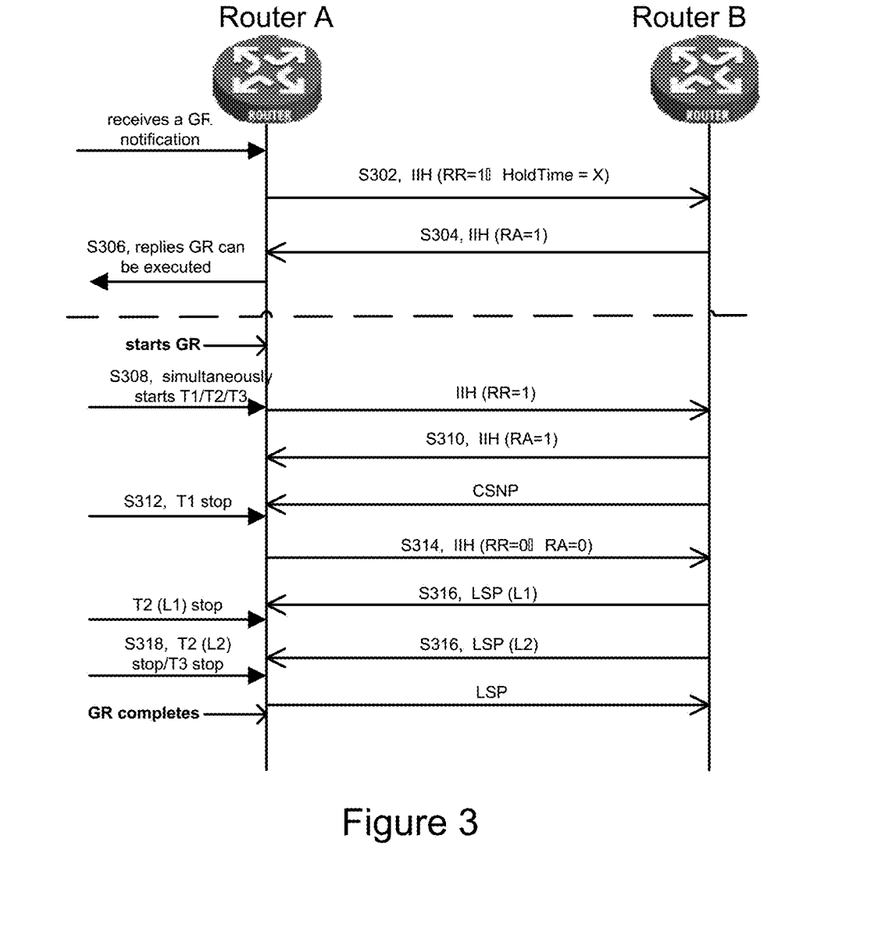
FIG. 3 is a flow chart of a specific operation process of the method for realizing GR according to another example of the present disclosure.

The method of the above example will be described in detail with reference to an actual instance shown in FIG. 3. In FIG. 3, suppose that a router A is the above first device, a router B is the above second device, the router A is connected with the router B, the router A and the router B have a stable IS-IS adjacency, the router A is enabled with GR capability, and the router A is restarted or performs an active/standby switchover at this time. A specific operation process of a method for realizing GR according to this example includes following blocks.

Block S302: after receiving a GR notification sent from a system, the router A sends an IIH packet with an RR flag set, and a value of a hold time field in the IIH packet is a larger value X.

Block S304: after the router B receives the IIH packet with the RR flag set and the value of the hold time field being the larger value X, the router B changes the hold time kept for the router A from the normal value to X, and replies an IIH packet with an RA flag set to the router A.

Block S306: after the router A receives the IIH packet with the RA flag set replied by the router B, the router A replies a notification that GR can be executed to the system.

When the router A does not receive the IIH packet with the RA flag set replied by the router B, it indicates that the packet is lost; the router A continues to send IIH packets with the RR flag set and the value of the hold time field being X until the router A receives the IIH packet with the RA flag set replied by the router B, and then the router A notifies the system to start executing GR.

Block S308: the system of the router A starts to execute the GR process, simultaneously starts a T1 timer, a Timer T2 and a T3 timer, and sends an IIH packet with an RR flag set to the router B; a value of a hold time field in the IIH packet is X.

Block S310: after the router B receives the IIH packet with the RR flag set sent by the router A in the block S308, the router B replies an IIH packet with an RA flag set and a CSNP packet to the router A.

Block S312: when the router A receives the IIH packet with the RA flag set and all CSNP packets replied by the router B before the T1 timer reaches a maximum expiration times, the router A cancels the T1 timer.

Block S314: the router A sends an IIH packet with both of an RR flag and an RA flag not set to the router B, and a value of a hold time field in the IIH packet is the normal value kept in the router B for the router A.

Block S316: after receiving the IIH packet with both of the RR flag and the RA flag not set and the hold time field being the normal value of the hold time kept in the router B for the router A, the router B synchronizes the LSDB of the router A to the router A, and restores the hold time of the router A from X to the normal value.

The router A receives the LSDB of the router A synchronized by the router B.

Block S318: when the router A completes the LSDB synchronization before the T2 timer expires, the router A cancels the T2 timer and the T3 timer.

For the methods of the above examples, one example of the present disclosure provides a first device used in the IS-IS network. The first device has GR capability. The first device can be any device capable of running the IS-IS protocol, such as a router, a server and so on, and this is not limited in the present disclosure.

Figure 4:
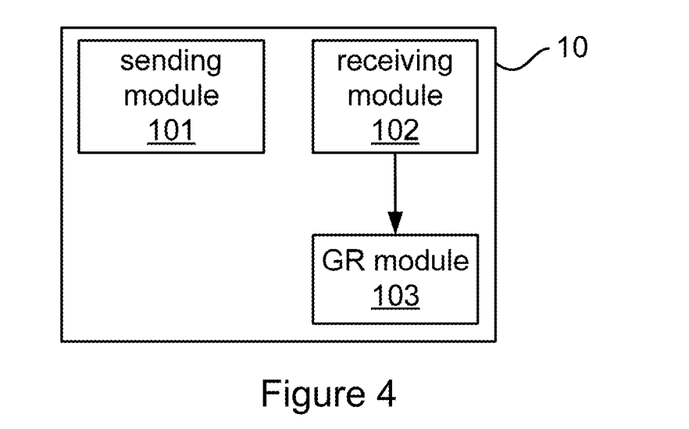
FIG. 4 is a schematic diagram illustrating a structure of a device in the IS-IS network according to one example of the present disclosure.

As shown in FIG. 4, a first device 10 includes following modules: a sending module 101, a receiving module 102 and a GR module 103.

The sending module 101 is to, before the first device 10 restarts an IS-IS protocol process, send an IIH packet with an RR flag set and a hold time field being a first predetermined value to a second device; the first predetermined value is greater than a normal value of a hold time kept in the second device for the first device; the first device has established an adjacency with the second device.

The receiving module 102 is to receive an IIH packet with an RA flag set replied by the second device. The IIH packet with the RA flag set is replied by the second device after the second device has updated the hold time kept in the second device for the first device according to the first predetermined value.

The GR module 103 is to, after the receiving module 102 receives the IIH packet with the RA flag set replied by the second device, restart the IS-IS protocol process and start to execute a GR process.

Figure 5:
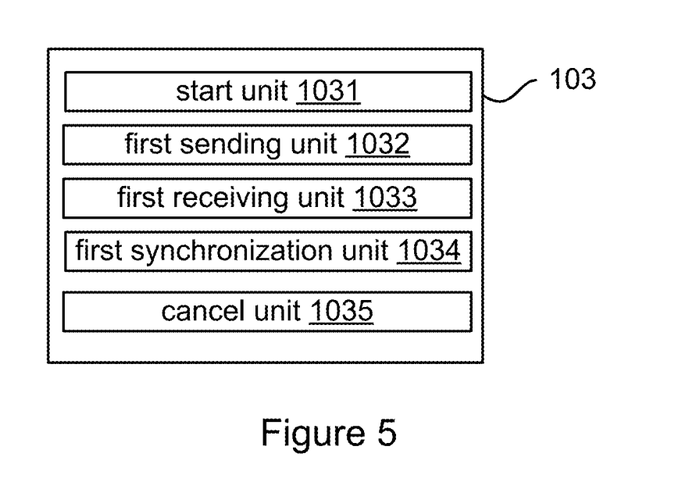
FIG. 5 is a schematic diagram illustrating a hardware architecture of a GR module shown in FIG. 4.

As shown in FIG. 5, the GR module 103 includes a start unit 1031, a first sending unit 1032, a first receiving unit 1033, a first synchronization unit 1034 and a cancel unit 1035.

The start unit 1031 is to simultaneously start a T1 timer, a Timer T2 and a T3 timer.

The first sending unit 1032 is to send an IIH packet with an RR flag set to the second device, and to send an IIH packet with both of an RR flag and an RA flag not set to the second device after the cancel unit 1035 cancels the T1 timer.

The first receiving unit 1033 is to receive the IIH packet with the RA flag set and CSNP packets replied by the second device.

The first synchronization unit 1034 is to synchronize LSDB after the first sending unit 1032 sends the IIH packet with both of the RR flag and the RA flag not set to the second device.

The cancel unit 1035 is to, when the first receiving unit 1033 receives the IIH packet with the RA flag set and all CSNP packets replied by the second device before the T1 timer reaches a maximum expiration time, cancel the T1 timer; and when the first synchronization unit 1034 completes the LSDB synchronization before the T2 timer expires, to cancel the T2 timer and the T3 timer.

Figure 6:
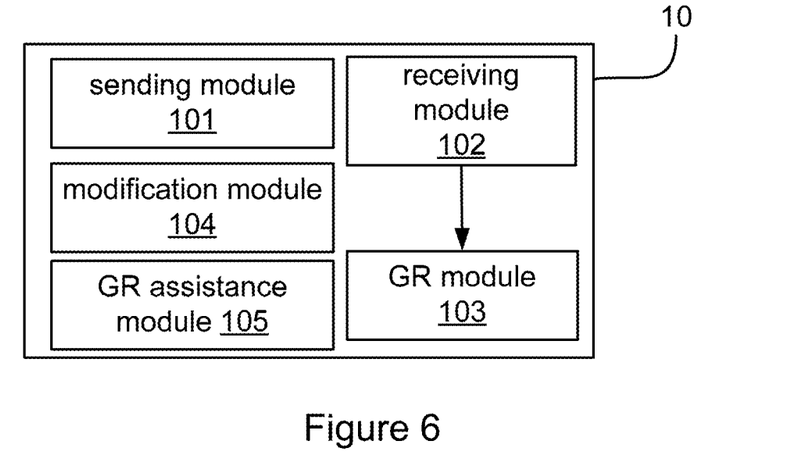
FIG. 6 is a schematic diagram illustrating a structure of a device in the IS-IS network according to another example of the present disclosure.

Further, according to another example of the present disclosure, as shown in FIG. 6, besides the above sending module 101, the receiving module 102 and the GR module 103, the first device 10 can further include following modules: a modification module 104 and a GR assistance module 105.

The receiving module 102 is further to receive an IIH packet with an RR flag set and a hold time field being a second predetermined value sent from the second device before the second device restarts an IS-IS protocol process; the second predetermined value is greater than a normal value of a hold time kept in the first device for the second device.

The modification module 104 is to, after the receiving module 102 receives the IIH packet with the RR flag set and the hold time field being the second predetermined value sent from the second device, update the hold time kept in the first device for the second device according to the second predetermined value.

The sending module 101 is to reply an IIH packet with an RA flag set to the second device.

The GR assistance module 105 is to help the second device to perform the GR process.

Figure 7:
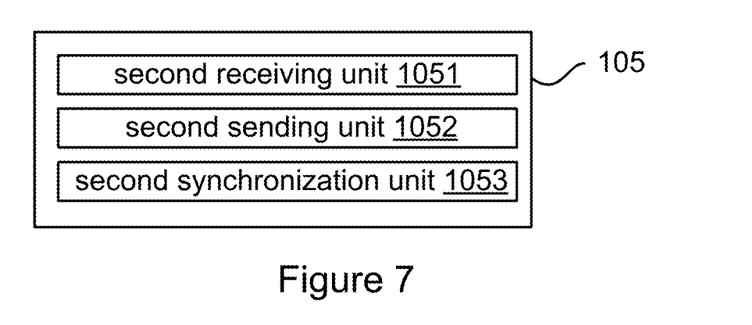
FIG. 7 is a schematic diagram illustrating a hardware architecture of a GR assistance module shown in FIG. 6.

As shown in FIG. 7, the GR assistance module 105 includes a second receiving unit 1051, a second sending unit 1052 and a second synchronization unit 1053.

The second receiving unit 1051 is to receive the IIH packet with the RR flag set sent from the second device, and is further to receive the IIH packet with both of the RR flag and the RA flag not set sent from the second device.

The second sending unit 1052 is to, after the second receiving unit 1051 receives the IIH packet with the RR flag set sent from the second device, reply an IIH packet with an RA flag set and a CSNP packet to the second device.

The second synchronization unit 1053 is to synchronize LSDB of the second device to the second device.

Further, the modification module 104 is further to, when the hold time field in the IIH packet with the RR flag set received by the second receiving unit 1051 is the normal value of the hold time kept in the first device for the second device, restore the hold time kept for the second device from the second predetermined value to the normal value; or, when the hold time field in the IIH packet with both of the RR flag and the RA flag not set received by the second receiving unit 1051 is the normal value of the hold time kept in the first device for the second device, restore the hold time kept for the second device from the second predetermined value to the normal value; or, after the GR assistance module 105 helps to complete executing the GR process, when the GR assistance module 105 receives the IIH packet with both of the RR flag and the RA flag not set sent from the second device and when the hold time field in the IIH packet with both of the RR flag and the RA flag not set is the normal value of the hold time kept in the first device for the second device, restore the hold time kept for the second device from the second predetermined value to the normal value. In this way, this will not affect a neighbor detection time in normal circumstances.

Modules or units in the first device 10 of one example of the present disclosure may be merged into one or be separately deployed; they may be merged into one module or unit, or may be further divided into multiple sub-modules or units. The modules or units in each example of the present disclosure may be implemented electronically. For example, a hardware module or unit may include dedicated circuitry or logic that is permanently configured (e.g., as a special-purpose processor, such as a field programmable gate array (FPGA) or an application-specific integrated circuit (ASIC) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry, or in temporarily configured circuitry (e.g., configured by software) may be driven by cost and time considerations.

Figure 8:
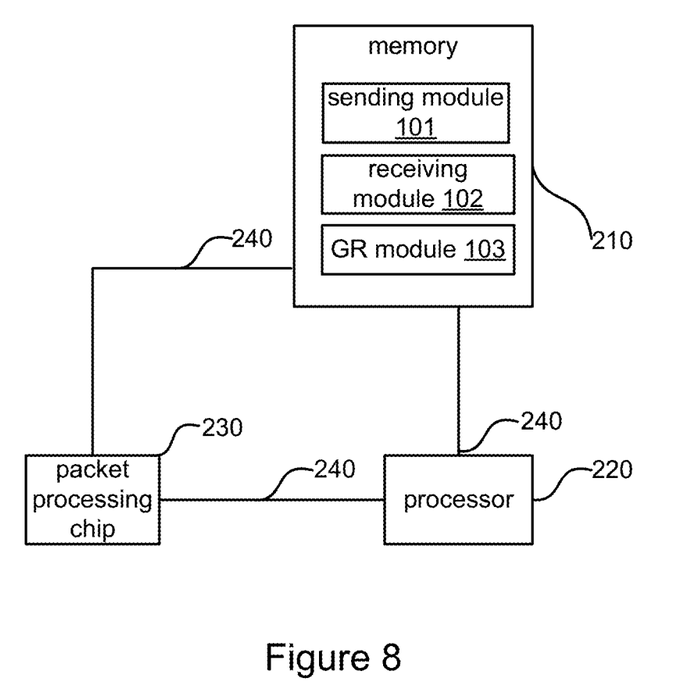
FIG. 8 is a schematic diagram illustrating a hardware architecture of a device in the IS-IS network according to one example of the present disclosure.

The first device of one example of the present disclose is described in above, and a hardware architecture of the first device according to one example of the present disclosure is given below. The first device may be a programmable device combined with hardware and software, specifically shown in FIG. 8. FIG. 8 is a schematic diagram illustrating a hardware architecture of a first device according to one example of the present disclosure. The first device includes a memory 210, a processor 220, a packet processing chip 230 and an interconnected mechanism 240 coupled with the memory 210, the processor 220 and the packet processing chip 230.

The memory 210 is a non-transitory machine readable memory and is to store machine readable instructions (e.g. instruction codes) and various kinds of data, for example, LSDB, the hold time of each neighbor device and so on. Machine readable instructions, shown as sending module 101, the receiving module 102, the GR module 103, the modification module 104 and the GR assistance module 105 and so on, may be stored in the memory 210.

The processor 220 is to communication with the packet processing chip 230 for receiving and sending protocol packets and data packets such as IIH packets, CSNP packets and so on. The processor 220 is further in communication with the memory 210 to read and execute the machine readable instructions stored in the memory 210, so as to complete the functions completed by modules in the above device such as the sending module 101, the receiving module 102, the GR module 103, the modification module 104 and the GR assistance module 105. The processor 220 is further to process packets reported by the packet processing chip 230.

The packet processing chip 230 is connected to other devices via interfaces thereof, and is responsible for processing to send and receive the above data packets and protocol packets. The packet processing chip 230 sends the IIH packet with the RR flag set and the hold time field being the first predetermined value, the IIH packet with the RR flag set, the IIH packet with the RA flag set and all CSNP packets sent from the processor 220 to neighbor devices which help the first device to perform the GR, and reports the received IIH packet with the RA flag set, all CSNP packets and IIH packet with the RR flag set and the hold time field being the second predetermined value to the processor 220.

The interconnected mechanism 240 is to provide information interactive channels between the modules, and can be a bus line connected with the memory 210, processor 220 and packet processing chip 230 or a plurality of lines among the above components.

It should be noted, the device shown in FIG. 8 is just one example, and can also adopt other structures different from the description in this example. For example, the operations completed by executing the above instruction codes may also be implemented by an application-specific integrated circuit (ASIC). Further, there may be one or more processors 220 included; when a plurality of processors 220 are included, the plurality of processors 220 are jointly responsible for reading and executing the instruction codes. Thus, specific structures of the first device are not specifically limited in the present disclosure.

From the above, the above examples of the present disclosure can achieve following technical effects:

before the first device restarts the IS-IS protocol process when the first device needs to restart the IS-IS protocol process due to reboot or software upgrade, etc., and before first device starts executing the GR process, the first device first performs a negotiation process with the second device which has established an adjacency with the first device. In the negotiation process, the first device first sends the IIH packet with the RR flag set and the hold time field being the first predetermined value which is larger to the second device; after the second device receives the IIH packet, the second device changes the hold time of the first device with the first predetermined value, and replies the IIH packet with the RA flag set to the first device for acknowledgement; after the first device receives the IIH packet with the RA flag set replied by the second device for acknowledgement, the first device restarts the IS-IS protocol process and starts to executing the GR process. Since the second device changes the hold time of the first device with a larger value during the GR process of the first device, thus, the second device deems that the first device exists within a time period of the specified larger value and helps the first device to complete the GR process without changing the existing GR operating mechanism. Further, the first device has performed the above negotiation process before the GR process, and the second device has changed the hold time of the first device with a larger value before receiving a first packet of the GR process; in this way, even if the first packet of the GR process is sent late, the second device will not delete the adjacency between the first device and the second device, which can avoid the GR failure caused by adjacency flapping and keep the adjacency normal.

The foregoing are only preferred embodiments of the present disclosure, and are not used to limit the present disclosure. Any modification, equivalent replacement, or improvement made without departing from the spirit and principle of the present disclosure should fall within the scope of the present disclosure.

What is claimed is:

1. A method for realizing graceful restart (GR) in an intermediate system-to-intermediate system (IS-IS) network, comprising:
    before restarting an IS-IS protocol process, sending by a first device an IS-IS hello (IIH) packet with a restart request (RR) flag set and a hold time field being a first predetermined value to a second device, wherein the first predetermined value is greater than a normal value of a hold time kept in the second device for the first device; and after receiving, by the first device, an IIH packet with a restart acknowledgement (RA) flag set from the second device, restarting, by the first device, the IS-IS protocol process and starting to execute, by the first device, a GR process by:
  starting a T1 timer, a T2 Timer and a T3 timer;
  sending an IIH packet with the RR flag set to the second device; and
  based on the first device receiving the IIH packet with the RA flag set and complete sequence number protocol data unit (CSNP) packets from the second device before the T1 timer reaches an expiration time, canceling the T1 timer.

2. The method of claim 1, wherein starting to execute, by the first device, a GR process further comprises:
  sending an IIH packet with both of the RR flag and the RA flag not set to the second device, and synchronizing a link state database (LSDB); and
  based on the first device completing the LSDB synchronization before the T2 timer expires, canceling the T2 timer and the T3 timer.

3. The method of claim 2, wherein, in the IIH packet with both of the RR flag and the RA flag not set sent to the second device when executing the GR process, the hold time field is the normal value of the hold time kept in the second device for the first device, and wherein the second device is to restore the hold time kept for the first device from the first predetermined value to the normal value.

4. The method of claim 2, wherein, in an IIH packet with both of the RR flag and the RA flag not set sent to the second device after the GR process is completed, the hold time field is the normal value of the hold time kept in the second device for the first device, and wherein the second device is to restore the hold time kept for the first device from the first predetermined value to the normal value.

5. The method of claim 1, wherein, in the IIH packet with the RR flag set sent to the second device when executing the GR process, the hold time field is the normal value of the hold time kept in the second device for the first device, and wherein the second device is to restore the hold time kept for the first device from the first predetermined value to the normal value.

6. The method of claim 1, further comprising:
  receiving, by the first device, an IIH packet with the RR flag set and a hold time field being a second predetermined value sent from the second device before the second device restarts an IS-IS protocol process, wherein the second predetermined value is greater than a normal value of a hold time kept in the first device for the second device;
  updating by the first device the hold time kept in the first device for the second device according to the second predetermined value;
  sending an IIH packet with the RA flag set to the second device; and
  helping, by the first device, the second device to perform the GR process.

7. The method of claim 6, wherein helping, by the first device, the second device to perform the GR process comprises:
  receiving, by the first device, an IIH packet with the RR flag set from the second device;
  sending, by the first device, an IIH packet with the RA flag set and a CSNP packet to the second device;
  receiving, by the first device, an IIH packet with both of the RR flag and the RA flag not set sent from the second device; and
  synchronizing, by the first device, a LSDB.

8. The method of claim 7, wherein, based on the hold time field in the IIH packet with the RR flag set received in a process of helping the second device to perform the GR process being the normal value of the hold time kept in the first device for the second device, restoring, by the first device, the hold time kept for the second device from the second predetermined value to the normal value.

9. The method of claim 7, wherein, based on the hold time field in the IIH packet with both of the RR flag and the RA flag not set received in the process of helping the second device to perform the GR process being the normal value of the hold time kept in the first device for the second device, restoring, by the first device, the hold time kept for the second device from the second predetermined value to the normal value.

10. The method of claim 7, wherein, based on the hold time field in the IIH packet with both of the RR flag and the RA flag not set sent from the second device and received after the first device helps the second device to complete executing the GR process being the normal value of the hold time kept in the first device for the second device, restoring by the first device the hold time kept for the second device from the second predetermined value to the normal value.

11. The method of claim 1, wherein the first device receives the IIH packet with the RA flag set from the second device after the second device updates the hold time kept in the second device for the first device according to the first predetermined value.

12. A first device of an intermediate system-to-intermediate system (IS-IS) network, the first device having graceful restart (GR) capability, the first device comprising a sending module, a receiving module, a modification module, a GR module, and a GR assistance module, wherein:
  the sending module is to, before the first device restarts an IS-IS protocol process, send an IIH packet with an RR flag set and a hold time field being a first predetermined value to a second device, the first predetermined value being greater than a normal value of a hold time kept in the second device for the first device;
  the receiving module is to receive an IIH packet with an RA flag set from the second device;
  the GR module is to, after the receiving module receives the IIH packet with the RA flag set from the second device, restart the IS-IS protocol process and start to execute a GR process;
  the receiving module is further to receive an IIH packet with the RR flag set and a hold time field being a second predetermined value sent from the second device before the second device restarts an IS-IS protocol process, the second predetermined value being greater than a normal value of a hold time kept in the first device for the second device;
  the modification module is to, after the receiving module receives the IIH packet with the RR flag set and the hold time field being the second predetermined value sent from the second device, update the hold time kept in the first device for the second device according to the second predetermined value;
  the sending module is to send an IIH packet with the RA flag set to the second device; and
  the GR assistance module is to help the second device to perform the GR process.

13. The device of claim 12, wherein the GR module comprises a start unit, a first sending unit, a first receiving unit, a first synchronization unit and a cancel unit, wherein the start unit is to start a T1 timer, a T2 Timer and a T3 timer;

the first sending unit is to send an IIH packet with the RR flag set to the second device, and to send an IIH packet with both the RR flag and the RA flag not set to the second device after the cancel unit cancels the T1 timer;

the first receiving unit is to receive the IIH packet with the RA flag set and complete sequence number protocol data unit (CSNP) packets sent by the second device;

the first synchronization unit is to synchronize a link state database (LSDB) after the first sending unit sends the IIH packet with both of the RR flag and the RA flag not set to the second device;

the cancel unit is to, based on the first receiving unit receiving the IIH packet with the RA flag set and all CSNP packets sent by the second device before the T1 timer reaches a maximum expiration time, cancel the T1 timer; and based on the first synchronization unit completing the LSDB synchronization before the T2 timer expires, cancel the T2 timer and the T3 timer.

14. The device of claim 12, wherein the first device receives the IIH packet with the RA flag set from the second device after the second device updates the hold time kept in the second device for the first device according to the first predetermined value.

15. The device of claim 12, wherein the GR assistance module comprises a second receiving unit, a second sending unit and a second synchronization unit;

the second receiving unit is to receive the IIH packet with the RR flag set sent from the second device, and is further to receive the IIH packet with both of the RR flag and the RA flag not set sent from the second device;

the second sending unit is to, after the second receiving unit receives the IIH packet with the RR flag set sent from the second device, send an IIH packet with the RA flag set and a CSNP packet to the second device; and the second synchronization unit is to synchronize a LSDB of the second device.

16. The device of claim 15, wherein the modification module is further to, based on the hold time field in the IIH packet with the RR flag set received by the second receiving unit being the normal value of the hold time kept in the first device for the second device, restore the hold time kept for the second device from the second predetermined value to the normal value; or, based on the hold time field in the IIH packet with both of the RR flag and the RA flag not set received by the second receiving unit being the normal value of the hold time kept in the first device for the second device, restore the hold time kept for the second device from the second predetermined value to the normal value; or, after the GR assistance module helps to complete executing the GR process, based on the GR assistance module receiving the IIH packet with both of the RR flag and the RA flag not sent from the second device and based on the hold time field in the IIH packet with both of the RR flag and the RA flag not set being the normal value of the hold time kept in the first device for the second device, restore the hold time kept for the second device from the second predetermined value to the normal value.

17. The device of claim 12, wherein the sending module is to establish an adjacency between the first device and the second device.

18. A non-transitory machine readable medium on which stored machine readable instructions that when executed by a processor cause the processor to:

before restarting an IS-IS protocol process, send an IS-IS hello (IIH) packet with a restart request (RR) flag set and a hold time field being a first predetermined value to a second device, wherein the first predetermined value is greater than a normal value of a hold time kept in the second device for the first device; and after receiving an IIH packet with a restart acknowledgement (RA) flag set from the second device, restart the IS-IS protocol process and to start execution of a GR process, start a T1 timer, a T2 Timer and a T3 timer;

send an IIH packet with the RR flag set to the second device; and based on the first device receiving the IIH packet with the RA flag set and complete sequence number protocol data unit (CSNP) packets from the second device before the T1 timer reaches a maximum expiration time, cancel the T1 timer.

19. The method of claim 18, wherein the instructions, when executed, cause the processor to:

send an IIH packet with both of the RR flag and the RA flag not set to the second device;

synchronize a link state database (LSDB); and based on the first device completing the LSDB synchronization before the T2 timer expires, cancel the T2 timer and the T3 timer.

20. The method of claim 18, wherein the instructions, when executed, cause the processor to:

receive an IIH packet with the RR flag set and a hold time field being a second predetermined value sent from the second device before the second device restarts an IS-IS protocol process, wherein the second predetermined value is greater than a normal value of a hold time kept in the first device for the second device;

update by the first device the hold time kept in the first device for the second device according to the second predetermined value;

send an IIH packet with the RA flag set to the second device; and help the second device to perform the GR process.

* * * * *